United States Patent [19]
Thoma et al.

[11] 3,900,688
[45] Aug. 19, 1975

[54] TEXTILE SUBSTRATE HAVING COATINGS OF POLYCARBONATE-POLYUREA ELASTOMER

[75] Inventors: Wilhelm Thoma, Bergisch-Neukirchen; Klaus Noll; Josef Pedain, both of Cologne; Hans Joachim Koch, Leverkusen, all of Germany

[73] Assignee: Bayer Aktiengesellschaft, Leverkusen, Germany

[22] Filed: Oct. 23, 1973

[21] Appl. No.: 408,977

[30] Foreign Application Priority Data
Oct. 25, 1972 Germany.............................. 2252280

[52] U.S. Cl. ............ 428/246; 156/247; 260/77.5 D; 260/77.5 AM; 427/177; 427/412; 427/428; 428/262; 428/412
[51] Int. Cl.$^2$.......................................... B32B 27/40
[58] Field of Search........ 117/76 T, 161 KP, 140 A; 260/77.5 CH, 77.5 D, 77.5 AM; 161/190

[56] References Cited
UNITED STATES PATENTS

| | | | |
|---|---|---|---|
| 3,586,525 | 6/1971 | Minobe et al............. | 117/161 KP X |
| 3,622,526 | 11/1971 | Zorn et al................. | 117/161 KP X |
| 3,678,011 | 7/1972 | Hino et al. .................... | 117/76 T X |
| 3,715,326 | 2/1973 | Traubel et al. ................. | 161/190 X |
| 3,734,894 | 5/1973 | Finelli et al. ........... | 260/77.5 AM X |
| 3,751,290 | 8/1973 | Santacecilia et al...... | 117/161 KP X |

*Primary Examiner*—Ralph Husack
*Attorney, Agent, or Firm*—Lawrence S. Pope

[57] ABSTRACT

This invention relates to bonding coats and top coats made of aliphatic, segmented polycarbonate-polyurea elastomers for coating textile substrates. The coats are applied to the substrates from their solutions by the reverse roll coating process. The coating used has the advantage of providing resistance to hydrolysis, light fastness, unlimited pot life and can be prepared with inexpensive and physiologically harmless solvents. The synthetic leather has a high abrasion resistance, high folding strength, high flexibility in the cold and resistance to alcohol.

6 Claims, No Drawings

TEXTILE SUBSTRATE HAVING COATINGS OF POLYCARBONATE-POLYUREA ELASTOMER

BACKGROUND OF THE INVENTION

This invention relates to the coating of textile substrates with protective and adhesive coatings made of substantially linear, segmented aliphatic polyurethane-urea elastomers based on polyurethane, which elastomers are dissolved in relatively volatile, low polar, physiologically harmless solvents. The products may be used, for example, as synthetic leather.

It has been known for a long time to coat textiles such as woven or knitted fabrics or fleeces with solutions of polyester urethanes by a direct or reverse roll coating process. The materials obtained in this way are used for the manufacture of outerwear, upholstery materials, bags and cases, shoe uppers, tarpaulins, awnings and many other articles.

It is known to use both two-component and single component polyurethane systems to coat textiles such as woven or knitted fabrics or fleeces. The known two component systems have the disadvantage of being sensitive to hydrolysis which results in a short pot life, of being very unstable to light and of having a tendency to degrade which results in reduced mechanical strength. One component polyurethane systems prepared from aliphatic diisocyanates have overcome the light instability problems and maintain their mechanical strength for a longer period of time than aromatic single component polyester urethanes. Coatings obtained from aliphatic single component polyester urethanes, however, are unstable to concentrated alcohols such as ethanol or isopropanol. The coatings swell in these solvents and become sticky.

It is an object of this invention to reduce or substantially obviate the above described disadvantages of the polyurethanes known in the art for the production of textile coatings and synthetic leather and to use materials for this purpose which combine the advantages of high resistance to hydrolysis, light-fastness and resistance to light and unlimited pot life as well as the advantages of being prepared with the use of inexpensive and physiologically harmless solvents as well as having high abrasion resistance, high folding strength, heat resistance and flexibility in the cold and resistance to alcohol.

SUMMARY OF THE INVENTION

In accordance with the invention bonding coats and top coats which may be applied to textile substrates from their solutions by the reverse roll coating process are provided. The bonding and top coats consist of polyurethane urea elastomers of the following formula:

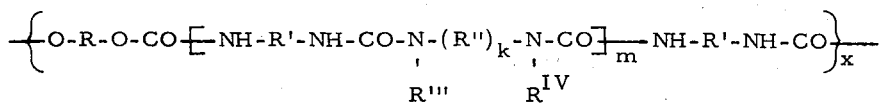

in which R represents the group $(-A-O-CO-O)_n-A-$, the bonding coats conforming to the condition that either 40 to 100% by weight and in particular 60 to 100% by weight of A or 0 to 40% by weight and preferably 0 to 10% by weight of A consists of

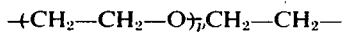

and of 0–60% by weight, preferably 0–40% by weight, or 60–100% by weight, preferably 90 to 100% by weight, of A consists of $-(CH_2)_q-$
while in the top coats 0–40% by weight and preferably 0–10% by weight of A consists of the group

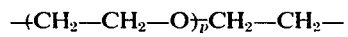

and 60–100% by weight, preferably 90 to 100% by weight of A consists of the group $-(CH_2)_q-$ and in which
$p = 2-7$, preferably 2–3,
$q = 6$ or 7,
$n = 2-40$,
R' and R'' represent divalent $C_4-C_{18}$ aliphatic and/or $C_5-C_{20}$ cycloaliphatic radicals and $$R' \neq R'' \text{ or } R' = R''$$

and
R''' and R$^{IV}$ represent H or $C_1-C_6$ aliphatic radicals,
$k = 0$ or 1,
$m = 0 - 4$,
and
$x = 5 - 200$.

The invention also provides coated textiles or synthetic leather produced by the process described above. Textiles coated according to the invention with bonding coats and top coats of aliphatic, segmented polyurethane urea elastomers are characterized by exceptionally high resistance to hydrolysis, lightfastness and resistance to light. The coatings are also extremely resistant to high percentage alcohols. The coating solutions have a practically unlimited pot life and contain inexpensive and physiologically harmless solvents.

The high resistance to hydrolysis and the resistance to high percentage alcohols is due to the special polycarbonates in the polyurethane urea elastomers and the lightfastness is due to the hard segments of aliphatic diisocyanates and aliphatic diamines. A particularly surprising feature of the elastomers is their exceptionally high resistance to light, which can be achieved by the combination of polycarbonate soft segments and the above mentioned aliphatic hard segments.

For coated textiles which are to be processed into outerwear and leather goods such as bags, it is particularly advantageous to use bonding coats based on copolycarbonates of hexanediol and tri- and tetra-ethylene glycols because the coating thereby obtained has a soft, pleasant handle, adheres firmly to the substrate and is durable to cleaning.

For the manufacture of upholstery goods, on the other hand, it is advisable to use bonding coats which, like the top coats, are based on hexanediol-polycarbonate. The coatings obtained when using these bonding coats have a particularly full handle, exceptionally high impact resistance and scratch resistance, high abrasion resistance and an attractive grain and therefore excellent appearance.

DESCRIPTION OF THE PREFERRED EMBODIMENTS

The aliphatic, segmented polyurethane elastomers which are used as top coats and bonding coats according to the invention contain soft segments based on polycarbonates which have been synthesized from hexane-1,6-diol and heptane-1,7-diol as well as from triethylene glycol, tetraethylene glycol, penta-, hexa-, hepta- and octaethylene glycol or mixtures of these glycols.

The polycarbonates used for the bonding coat are those which have been obtained from 40 – 100% by weight, preferably 60 – 100% by weight of tetraethylene glycol and 0 –60% by weight, preferably 0 – 40% by weight of hexane-1,6-diol. The polycarbonates used for the top coat are those obtained from 0 – 40% by weight, preferably 0 – 10% by weight of tetraethylene glycol and 60 – 100% by weight, preferably 90 – 100% by weight of hexane-diol. For certain purposes, however, it may be desirable to use a polyurethane of the same composition for both the bonding coat and the top coat.

Synthesis of the polycarbonates is carried out by known processes. The glycols are condensed either with diarylcarbonates such as diphenylcarbonate so that phenol is split off or with phosgene so that hydrochloric acid is split off (see e.g., German Offenlegungsschrift No. 1,915,908).

For preparing the elastomers used according to the invention, the usual aliphatic or cycloaliphatic low molecular weight diisocyanates used in polyurethane chemistry may be employed. The following, for example, may be employed: Hexane-1,6-diisocyanate; 2,2,4-trimethylhexane-1,6-diisocyanate; 1-isocyanato-3-isocyanatomethyl3,5,5-trimethyl-cyclohexane; 3,3'-dimethyl-4,4'-diisocyanatodicyclohexylmethane; 4,4'-dicyclohexylmethane diisocyanate; 1,3-cyclohexane diisocyanate and 1,4-cyclohexane diisocyanate and mixtures of these isomers as well as lysine-$C_1$–$C_6$-alkyl ester diisocyanates. The preferred diisocyanates for the polyurethane elastomers used for the bonding coat are hexane-1,6-diisocyanate; 1-isocyanato-3-isocyanatomethyl-3,5,5-trimethylcyclohexane or mixtures of these compounds, e.g., in the ratio of 1:1. The preferred diisocyanate for the top coat elastomer is 1-isocyanato-3-isocyanato-methyl-3,5,5-trimethylcyclohexane. The chain lengthening agents used for the preparation of the aliphatic, segmented polyurethane elastomers according to the invention may be either primary or secondary aliphatic diamines, for example, piperazine, hexamethylenediamine, ethylenediamine, propylene-1,2-diamine, N-methyl-bis-(3-aminopropyl)amine, 1,4-(or 1,3-) diaminocyclohexane, 1-amino-3-aminomethyl-3,5,5-trimethyl cyclohexane or bis-(4-aminocyclohexyl)-methane.

The preferred diamines are those which contain cyclohexane rings. Hydrazine, hydrazine hydrate and N,N'-dimethyl hydrazine are also suitable for use as chain-lengthening agents, as well as bis-hydrazides such as β-semicarbazidopropionic acid hydrazide, 3-semicarbazido-propylcarbazic ester, adipic acid dihydrazide and glutaric acid dihydrazide but particularly semicarbazido-3-semicarbazidomethyl-3,5,5-trimethylcyclohexane.

The preferred chain lengthening agents for the polyurethane elastomer used as bonding coat are hydrazine hydrate and 4,4'-diaminodicyclohexylmethane or mixtures thereof which preferably contain the components in proportions by weight of 1:4. The chain lengthening agent used in the top coat elastomer is preferably 4,4'-diaminodicyclohexylmethane.

In order to obtain products with the desired hydrolytic and mechanical properties and the advantageous resistance to solvents which is characteristic of the invention, the diisocyanates used for preparation of the prepolymer, and/or the chain lengthening agents are chosen such that at least 20 mol percent and preferably more than 40 mol percent of cycloaliphatic components are employed.

The preferred polycarbonate urethane urea elastomers for producing the bonding coats are therefore those obtained from hexanediol/tetraethylene glycol-polycarbonate, 1-isocyanato-3-isocyanatomethyl-3,5,5-trimethylcyclohexane, hexane diisocyanate, 4,4'-diaminodicyclohexylmethane and hydrazine hydrate. Polycarbonate urethane urea elastomers which have been synthesized from hexanediol polycarbonate, 1-isocyanato-3-isocyanato-methyl-3,5,5-trimethylcyclohexane and 4,4'-diaminodicyclohexylmethane are preferred for producing the top coats although, as already mentioned above, they may for some purposes also be used as bonding coat.

The solvents used for the aliphatic, segmented polyurethane elastomers may be mixtures of aromatic hydrocarbons, esters, alcohols and ketones, e.g., toluene, xylene, ethyl benzene, ethyl acetate, methyl-or ethylglycol acetate and butyl acetate; ethanol, isopropanol, n-butanol, isobutanol, secondary butanol, tertiary butanol, amyl alcohols, cyclohexanol, diacetone alcohol, methyl glycol ether, ethyl glycol ether, butyl glycol ether, acetone, methyl ethyl ketone and methyl isobutyl ketone. The preferred mixtures consist of toluene, methyl glycol acetate and isopropanol or toluene, ethanol and methyl glycol ether or xylene, ethyl glycol ether and isopropanol. The solutions preferably have a polyurethane solids content of 25 to 35%, and especially 28 to 32%.

The polyurethane urea elastomers used according to the invention are preferably prepared as follows: A prepolymer with terminal NCO groups is first prepared in known manner from the polycarbonate macrodiols and diisocyanates. The reaction is generally carried out at 50° to 150°C, preferably without solvents or in an inert organic anhydrous solvent, e.g., in ketones, esters, aromatic hydrocarbons or mixtures of these solvents. NCO prepolymer formation is generally carried out at an OH/NCO reaction ratio of 1:1.5 to 1:5, preferably 1:1.5 to 1:3.5, the ratio depending on the molecular weight of the polycarbonate macrodiol and on the desired properties of the end products. (If the molar ratios are less than 1:2, the mixture still contains free monomeric diisocyanate after the reaction. The term "prepolymer" used hereinafter also covers such mixtures.) It is generally aimed to employ a ratio such that the NCO content of the solvent-free prepolymer is between 1.0 and 10.0% by weight of NCO.

The prepolymer which contains NCO groups is then reacted to yield the polyurethane urea elastomer according to the invention. This reaction is carried out with the diamine, hydrazine or dihydrazide with cooling, generally at −20°C to 40°C, preferably at 0° to 30°C.

Thereafter, the chain lengthening agent, preferably dissolved in alcohol, is added to the prepolymer dissolved in the inert solvent or solvent mixture.

The process may, of course, be reversed, i.e., the solution of prepolymer may be added to the solution of the diamine, hydrazine or dihydrazide. The chain lengthening reaction itself always takes place in a homogeneous phase because true solutions are formed when the prepolymer is mixed with the dissolved chain lengthening agent.

The presence of an excess of basic groups should as far as possible be avoided in this reaction. The diamines, hydrazines or bis-hydrazides are preferably reacted with the NCO prepolymers in a ratio of 0.8:1 to 1:1. Small proportions of monoamine may be added in the usual manner to effect chain breaking in the polyaddition reaction.

Fillers, pigments and other auxiliary agents may be added to the solutions for the top coats and bonding coats, e.g., polysiloxanes or urea resins or also polyisocyanates if, for example t-butanol is used in the solvent mixture instead of primary or secondary alcohols (in addition to aromatic compounds and esters).

Production of the textile coatings and synthetic leather is carried out with the aid of the known commercial devices and coating apparatus. For example, commercial release paper may be coated by a wet process with a 30% top coat solution to produce a coating of about 60 to 150 g/m². The solvents are then evaporated in the drying channel of the coating apparatus at 40° to 150°C, preferably 60° to 120°C while the paper is passed through at the rate of 3 to 20 m/min, preferably 6 to 15 m/min. The solution of bonding coat is then applied in exactly the same way and the coated paper is then bonded to the textile substrate, e.g. a woven or knitted fabric or fleece weighing 150 to 300 g per m², the solvent is evaporated in the drying channel, the release paper is removed and the coated article is rolled up separately from the release paper.

The coated webs may then be treated with a finish by known processes. For this purpose, the top coat solutions described above may, for example, be used with an addition of cross-linkable polydimethylsiloxanes, urea resins and/or melamine resins and the necessary catalysts for the crosslinking reaction, optionally after dilution with additional solvent.

The invention may be better understood by referring to the examples that follow wherein all parts and percentages are by weight unless otherwise specified.

EXAMPLE 1

Top coat solution T1 was applied to a release paper by means of a doctor roll in a coating apparatus. The quantity applied was 120 g of solution per m². After its first passage through the drying channel which had an air temperature of 70°C at the entrance and 120°C at the exit, the web of release paper was returned and the solution of bonding coat B1 was applied in a similar manner, the amount applied being 120 g/m². The textile web, a napped cotton Duvetyn weighing 240 g/m² was then bonded to it and the solvent mixture in the bonding coat was evaporated off in the second passage through the drying channel. On leaving the drying channel, the release paper and the coated textile web were rolled up separately from each other.

Top coat solution T1 was a 30% solution of a segmented polycarbonate urethane urea elastomer in toluene/methyl glycol acetate/isopropanol (3:1:4). The elastomer had been synthesized by the prepolymer process described above from 73 parts by weight of hexanediol polycarbonate with a molecular weight of 2000, 18 parts by weight of 1-isocyanato-3,3,5-trimethyl-5-isocyanatomethylcyclohexane and 9 parts by weight of 4,4'-diaminodicyclohexylmethane.

The bonding coat solution B1 was a 30% solution of a segmented polycarbonate urethane urea elastomer in toluene/ethanol/methyl glycol (2.5:2.5:1) which had been prepared by a prepolymer process from 71 parts by weight of a hexanediol/tetraethyleneglycol copolycarbonate with a molecular weight of about 1,400, 10 parts by weight of hexanediisocyanate, 13 parts by weight of 1-isocyanato-3,3,5-trimethyl-5-isocyanatomethylcyclohexane, 1 part by weight of hydrazine hydrate and 5 parts by weight of 4,4'-diaminodicyclohexylmethane. About 5% of a commercial 50% pigment paste could be stirred into this solution to color it. The quality of the textile coating prepared from top coat solution T1 and bonding coat solution B1 was determined by testing the properties indicated in the following table of films which had been prepared from unpigmented top coat solution T1 and bonding coat solution B1. The technical advance of the coatings according to the invention compared with coatings prepared according to the known art in Comparison Examples I to III is demonstrated particularly by the lightfastness, resistance to light and resistance to hydrolysis. The resistance to light and resistance to hydrolysis are expressed in terms of the decrease in strength (in percent of the original value) of the unpigmented films:

| | | |
|---|---|---|
| excellent | decrease | 0–3% |
| very good | " | 4–20% |
| good | " | 21–35% |
| satisfactory | " | 36–50% |
| sufficient | " | 51–65% |
| poor | " | >65% |

Coated textiles produced with T1 and B1 have a pleasant, soft handle and excellent mechanical properties. Concentrated alcohols and aromatic solvents have no dissolving or swelling action on them. The products are particularly suitable for processing into outerwear and leather goods such as bags.

TABLE I

| | Top Coat T1 | Bonding Coat B1 |
|---|---|---|
| Microhardness Shore A | 88 | 75 |
| Original value of tensile strength (DIN 53504) | 520 kp/cm² | 170 kp/cm² |
| Elongation at break (DIN 53504) | 420% | 750% |
| Light fastness (DIN 54004) | 7–8 | 7–8 |
| Resistance to light | | |
| a) 66 h Fade-o-meter | very good | very good |
| b) 400 h Xenotest | excellent | very good |
| Resistant to hydrolysis | | |
| 7d, 70°C, 95% relative humidity | excellent | excellent |
| 14d, 70°C, 95% relative humidity | very good | very good |
| 49d, 70°C, 95% relative humidity | very good | good |
| alcohol resistance | good | good |

EXAMPLE 2

Top coat solution T2 was a 30% solution of a segmented polycarbonate urethane urea elastomer in xylene/ethylene glycol/isopropanol (3:2:2); the elastomer was synthesized in the same way as top coating solution T1.

Bonding coat solution B2 was a 35% solution of a segmented polycarbonate urethane urea elastomer in toluene/ethanol (3:3.5) which had been synthesized from 73.5 parts by weight of a hexanediol/tetraethylene glycol copolycarbonate (molecular weight about 1,400), 8.5 parts by weight of hexane diisocyanate, 12 parts by weight of 1-isocyanato-3-isocyanatomethyl-3,5,5-trimethylcyclohexane, 1.5 parts by weight of hydrazine hydrate and 4.5 parts by weight of 1-amino-3-aminomethyl-3,5,5-trimethylcyclohexane. The solution could be pigmented as in Example 1. Top coat solution T2 and bonding coat solution B2 were applied by a reverse coating process in a manner analogous to Example 1 to produce a high quality textile coating which was similar in its properties to the products of Example 1. The properties are set forth in Table II.

TABLE II

|  | Top coat T2 | Bonding coat B2 |
|---|---|---|
| Microhardness (Shore A) | 88 | 69 |
| Original tensile strength (DIN 53504) | 520 kp/cm$^2$ | 160 kp/cm$^2$ |
| Elongation at break (DIN 53504) | 420% | 760% |
| Light fastness (DIN 54004) | 7–8 | 7–8 |
| Resistance to light<br>a) 66 H Fade-o-meter<br>b) 400 h Xeno test | very good<br>excellent | very good<br>excellent |
| Resistance to hydrolysis<br>7d, 70°C, 95% relative humidity<br>14d, 70°C, 95% relative humidity | excellent<br>very good | very good<br>very good |
| Alcohol resistance | good | good |

EXAMPLE 3

Top coat solution T3 was identical with top coat solution T1 of Example 1.

Bonding coat solution B3 was a 35% solution of a segmented polycarbonate urethane urea elastomer in toluene/isopropanol/methyl glycol (5:5:2) which had been synthesized from 70 parts by weight of a hexanediol/tetraethylene glycol copolycarbonate (molecular weight about 1,400), 23 parts by weight of 1-isocyanato-3-isocyanatomethyl-3,5,5-trimethylcyclohexane, 1.5 parts by weight of hydrazine hydrate and 5.5 parts by weight of 4,4'-diaminodicyclohexylmethane. After pigmenting the two solutions, a high quality coating was produced by the reverse coating process in a manner analogous to Example 1. The properties of these coatings are shown in Table III.

EXAMPLE 4

Top coat solution T4 was identical with top coat solution T2. Bonding coat solution B4 was a 30% solution of segmented polycarbonate urethane urea elastomer in toluene/ethylene/glycol/isopropanol (3:2:2) which had been synthesized in the same way as the elastomer of top coat solution T1.

After pigmenting the two solutions, high quality coatings with a full handle and excellent mechanical resistance were obtained by the reversal process in a manner analogous to Example 1. They are especially suitable for products of the upholstery goods industry such as furniture upholstery and motor car upholstery. The properties of coatings T4 and B4 are shown in Table IV.

TABLE III

|  | Top coat T3 | Bonding coat B3 |
|---|---|---|
| Microhardness (Shore A) | 88 | 75 |
| Original tensile strength (DIN 53504) | 520 kp/cm$^2$ | 300 kp/cm$^2$ |
| Elongation at break (DIN 53504) | 420% | 460% |
| Light fastness (DIN 54004) | 7–8 | 7–8 |
| Resistance to light<br>a) 66 h Fade-o-meter<br>b) 400 h Xeno test | very good<br>excellent | very good<br>very good |
| Resistance to hydrolysis<br>7d, 70°C, 95% relative humidity<br>14d, 70°C, 95% relative humidity<br>49d, 70°C, 95% relative humidity | excellent<br>very good<br>very good | very good<br>very good<br>good |
| Alcohol resistance | good | good |

TABLE IV

|  | Top coat T4 | Bonding coat B4 |
|---|---|---|
| Microhardness (Shore A) | 88 | 88 |
| Original tensile strength (DIN 53504) | 520 kp/cm$^2$ | 520 kp/cm$^2$ |
| Elongation at break (DIN 53504) | 420% | 420% |
| Light fastness (DIN 54004) | 7–8 | 7–8 |
| Resistance to light<br>a) 66 h Fade-o-meter<br>b) 400 h Xeno test | very good<br>excellent | very good<br>excellent |
| Resistance to hydrolysis<br>7d, 70°C, 95% relative humidity<br>14d, 70°C, 95% relative humidity<br>49d, 70°C, 95% relative humidity | excellent<br>very good<br>very good | excellent<br>very good<br>very good |
| Alcohol resistance | good | good |

Comparison Examples

Comparison Example I

Top coat solution C/T1 was a 25% solution of a segmented polyester urethane elastomer in dimethylformamide/methyl ethyl ketone (3:2) which had been synthesized from 70 parts by weight of a polyester from butanediol and adipic acid (molecular weight about 2,200), 5.5 parts by weight of butanediol and 25 parts by weight of 4,4'-diphenylmethanediisocyanate.

The bonding coat solution C/B1 was a 25% solution of a segmented polyester urethane elastomer in dimethylformamide/methyl ethyl ketone (1:1) which had been synthesized from 68 parts by weight of a copolyester hexanediol, neopentyl glycol and adipic acid (molecular weight about 1,700), 5.5 parts by weight of butanediol and 26 parts by weight of 4,4'-diphenylmethane diisocyanate.

After pigmenting the two solutions, a coating product was produced by the reverse coating process in a manner analogous to Example 1. It differed from the articles according to the invention by its reduced lightfastness and reduced resistance to light and to hydrolysis.

The properties of these coatings are shown in Table C/I.

Comparison Example II

Top coat solution C/TII and bonding coat solution C/BII were identical with top coat solution C/TI. After pigmenting the two solutions, a coating product was produced by the reverse coating process in a manner analogous to Example 1. It differed from the articles according to the invention by its reduced lightfastness and reduced resistance to light and to hydrolysis. The properties of these coatings are shown in Table C/II.

TABLE C/I

|  | Top coat C/TI | Bonding coat C/BI |
|---|---|---|
| Microhardness (Shore A) | 86 | 75 |
| Original tensile strength (DIN 53504) | 500 kp/cm² | 400 kp/cm² |
| Elongation at break (DIN 53504) | 600% | 550% |
| Light fastness (DIN 54004) | 3–4 | 4 |
| Resistance to light a) 66 h Fade-o-meter b) 400 h Xeno test | sufficient sufficient | sufficient sufficient |
| Resistance to hydrolysis 7d, 70°C, 95% relative humidity 14d, 70°C, 95% relative humidity 49d, 70°C, 95% relative humidity | very good good satisfactory | good good poor |
| Alcohol resistance | good | good |

TABLE C/II

|  | Top coat C/TII | Bonding coat C/BII |
|---|---|---|
| Microhardness (Shore A) | 86 | 86 |
| Original tensile strength (DIN 53504) | 500 kp/cm² | 500 kp/cm² |
| Elongation at break (DIN 53504) | 600% | 600% |
| Light fastness (DIN 54004) | 3–4 | 3–4 |
| Resistance to light a) 66 h Fade-o-meter b) 400 h Xeno test | sufficient sufficient | sufficient sufficient |
| Resistance to hydrolysis 7d, 70°C, 95% relative humidity 14d, 70°C, 95% relative humidity 49d, 70°C, 95% relative humidity | very good good satisfactory | very good good satisfactory |
| Alcohol resistance | good | good |

Comparison Example III

Top coat solution C/TIII was a 30% solution of a segmented polyester urethane urea elastomer in toluene/isopropanol (1:1) which had been synthesized from 71.5 parts by weight of a copolyester of hexanediol/neopentyl glycol and adipic acid (molecular weight about 1700), 20 parts by weight of 1-isocyanato-3-isocyanatomethyl-3,5,5-trimethylcyclohexane and 8.5 parts by weight of 1-amino-3-aminomethyl-3,5,5-trimethylcyclohexane.

The bonding coat solution C/BIII was a 30% solution of a polyester urethane in ethyl acetate which had been synthesized from 50 parts by weight of a polyester of ethylene glycol and adipic acid (molecular weight about 2,000) and 50 parts by weight of a polyester of diethylene glycol and adipic acid (molecular weight about 2,000) and 7.8 parts by weight of 2,4-tolylene diisocyanate.

5 parts by weight of a 75% solution of a polyisocyanate in ethyl acetate (NCO-number 10.5) prepared from 1 mol of trimethylolpropane and 3 mols of tolylene-2,4-diisocyanate and 5 parts by weight of a 10% catalyst solution in ethylene chloride/ethyl acetate (1:1) which contained a reaction product of N-methyldiethanolamine and 2 mols of phenylisocyanate and 10 parts by weight of dimethylformamide were added to every 100 g of this bonding coat solution.

After pigmenting the two solutions, a coating product was produced by a reverse coating process in a manner analogous to Example 1. Compared with the articles according to the invention, this product was characterized by its reduced resistance to light and to hydrolysis. Properties are shown in Table C/III.

TABLE C/III

|  | Top coat C/TIII | Bonding coat C/BIII |
|---|---|---|
| Microhardness (Shore A) | 83 | 70 |
| Original tensile strength (DIN 53504) | 500 kp/cm² | 350 kp/cm² |
| Elongation at break (DIN 53504) | 550% | 700% |
| Light fastness (DIN 55004) | 7 | 4–5 |
| Resistance to light a) 66 h Fade-o-meter b) 400 h Xeno test | satisfactory good | sufficient poor |
| Resistance to hydrolysis 7d, 70°C, 95% relative humidity 14d, 70°C, 95% relative humidity 49d, 70°C, 95% relative humidity | very good very good poor | sufficient poor poor |
| Alcohol resistance | poor | good |

What is claimed is:

1. Laminates comprising a textile substrate which is a woven or knitted fabric or fleece and having bonded thereto a bonding coat and a top coat of an aliphatic, segmented polycarbonate-polyurea elastomer of the general formula:

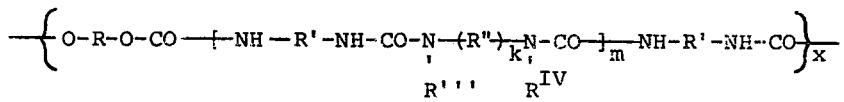

in which R is the group

where A is

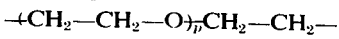

or

and $p = 2-7$

[q = 6,7] q = 6 or 7
n = 2–40 and in which

R' and R" are the same or different and represent divalent $C_4$-$C_{18}$ aliphatic and/or $C_5$-$C_{20}$ cycloaliphatic radicals, R''' and $R^{IV}$ is H or $C_1$-$C_6$ aliphatic radicals, k = 0 or 1, m = 0–4, and x = 5–200 and wherein at least 20 mol percent of the aliphatic and cycloaliphatic groups are cycloaliphatic, with the proviso that in the top coat A is 0–40% by weight $-(CH_2-CH_2-O)_p CH_2-CH_2-$ and [40-100%] 60–100% by weight $-(CH_2)_q-$.

2. The laminate of claim 1 wherein in the general formula the group A is derived from diols selected from the group consisting of hexane-1,6-diol, heptane-1,7-diol, triethylene glycol, tetraethylene glycol, pentaethylene glycol, hexaethylene glycol, heptaethylene glycol and octaethylene glycol.

3. The laminate of claim 1 wherein the radicals R', R", R''' and $R^{IV}$ are derived from hexanediisocyanate, 1-isocyanato-3-isocyanatomethyl-3,5,5-trimethylcyclohexane, 4,4'-diaminodicyclohexylmethane and hydrazine hydrate.

4. The laminate of claim 1 wherein in the bonding coat A is from about 40 to 100 wt. % of $-(CH_2-CH_2-O)_p CH_2-CH_2-$ and about 60 to 0 wt. % of $-(CH_2)_q-$.

5. The laminate of claim 4 wherein in the top coat A is from about 90 to 100 wt. % of $-(CH_2)_q-$ and from about 10 to 0 wt. % of $-(CH_2-CH_2-O)_p CH_2-CH_2-$.

6. The laminate of claim 5 wherein in the bonding coat A is from about 60 to 100 wt. % of $-(CH_2-CH_2-O)_p CH_2-CH_2-$ and about 40 to 0 wt. % of $-(CH_2)_q-$.

* * * * *

UNITED STATES PATENT AND TRADEMARK OFFICE
CERTIFICATE OF CORRECTION

PATENT NO. : 3,900,688
DATED : August 19, 1975
INVENTOR(S) : WILHELM THOMA, KLAUS NOLL, JOSEF PEDAIN
HANS JOACHIM KOCH It is certified that error appears in the above-identified patent and that said Letters Patent are hereby corrected as shown below:

Column 3, lines 28 & 29 correct the spelling of --1-isocyanato-3-isocyanato-methyl-3,5,5-trimethyl-cyclohexane--.

Column 8, line 54 correct the spelling of --4,4'-diphenylmethane diisocyanate--.

Column 11, line 1, delete "[q=6, 7]"; same column, line 15, delete "[40-100%]".

Signed and Sealed this

Eighth Day of March 1977

[SEAL]

Attest:

RUTH C. MASON
Attesting Officer

C. MARSHALL DANN
Commissioner of Patents and Trademarks